US010215119B2

(12) United States Patent
Mei et al.

(10) Patent No.: US 10,215,119 B2
(45) Date of Patent: Feb. 26, 2019

(54) MACHINE HAVING CONTINUOUSLY VARIABLE TRANSMISSION, AND CONTROL SYSTEM AND OPERATING METHOD THEREFOR

(71) Applicant: Caterpillar Inc., Peoria, IL (US)

(72) Inventors: Barry Mei, Oswego, IL (US); Jeffrey Berry, Yorkville, IL (US)

(73) Assignee: Caterpillar Inc., Deerfield, IL (US)

( * ) Notice: Subject to any disclaimer, the term of this patent is extended or adjusted under 35 U.S.C. 154(b) by 339 days.

(21) Appl. No.: 15/083,761

(22) Filed: Mar. 29, 2016

(65) Prior Publication Data

US 2017/0284325 A1 Oct. 5, 2017

(51) Int. Cl.

| | |
|---|---|
| ***B60W 10/06*** | (2006.01) |
| ***F02D 41/10*** | (2006.01) |
| ***F02D 41/30*** | (2006.01) |
| ***F02D 41/02*** | (2006.01) |
| ***E02F 9/20*** | (2006.01) |
| ***E02F 9/26*** | (2006.01) |
| *E02F 3/34* | (2006.01) |

(52) U.S. Cl.

CPC .......... *F02D 41/107* (2013.01); *E02F 9/2066* (2013.01); *E02F 9/26* (2013.01); *F02D 41/0215* (2013.01); *F02D 41/3005* (2013.01); *E02F 3/34* (2013.01)

(58) Field of Classification Search

CPC ............. F02D 41/0205; F02D 41/0215; B60Y 2200/22

See application file for complete search history.

(56) References Cited

U.S. PATENT DOCUMENTS

| | | | | |
|---|---|---|---|---|
| 4,663,713 A * | 5/1987 | Cornell et al. | B60K 41/20 | 74/625 |
| 5,575,737 A * | 11/1996 | Weiss et al. | G06F 19/00 | 477/43 |
| 7,086,226 B2 | 8/2006 | Oguri | | |
| 8,585,543 B1 | 11/2013 | Davis et al. | | |
| 8,696,509 B2 | 4/2014 | Panizzolo et al. | | |
| 8,725,366 B2 | 5/2014 | Hubbard et al. | | |
| 8,808,136 B2 | 8/2014 | Mattsson et al. | | |
| 9,097,344 B2 | 8/2015 | Hoff et al. | | |
| 2004/0249543 A1* | 12/2004 | Kilworth et al. | G06F 19/00 | 701/54 |
| 2005/0034913 A1* | 2/2005 | Dahl et al. | B60L 3/02 | 180/272 |
| 2005/0071066 A1* | 3/2005 | Rose et al. | G06F 19/00 | 701/54 |
| 2010/0145581 A1* | 6/2010 | Hou | G06F 19/00 | 701/50 |

FOREIGN PATENT DOCUMENTS

JP 09163814 A * 6/1997 ............. A01B 67/00

* cited by examiner

*Primary Examiner* — Tisha D Lewis

(74) *Attorney, Agent, or Firm* — Jonathan F. Yates

(57) ABSTRACT

Operating a machine including a continuously variable transmission (CVT) includes operating an engine of the machine at a lower engine speed, receiving data indicative of an expected increase in load on the engine, and commanding increasing the engine speed responsive to the data. The engine is operated at a higher engine speed responsive to the commanded increase, with the operation at the higher engine speed being initiated proactively so as to limit retarding a ground speed of the machine. Related control logic and machine structure is also disclosed.

18 Claims, 4 Drawing Sheets

MACHINE HAVING CONTINUOUSLY VARIABLE TRANSMISSION, AND CONTROL SYSTEM AND OPERATING METHOD THEREFOR

TECHNICAL FIELD

The present disclosure relates generally to operation of a machine having a continuously variable transmission (CVT), and more particularly to operation of such a machine where engine speed is proactively controlled in anticipation of transient load changes on the engine.

BACKGROUND

A continuously variable transmission (CVT) provides a continuous range of transmission ratios between an input shaft and an output shaft. In ground-engaging machines, the use of a CVT is well-known for certain applications, and interest in applying such technology to new environments and machine types exists. A variety of different designs are known, including various pulley systems having variable-diameter pulley wheels, belted systems where a drive belt connects rotating cones, hydrostatic or "hystat" transmissions, certain electric drive machines and still others.

CVT's provide certain desirable properties over manual transmissions and over other types of automatic transmissions. For instance, with a CVT it is often possible to maintain engine speed more or less constant, or vary engine speed within a relatively narrow speed range, while torque applied to a load such as a machine driveline is varied principally by adjustment of the transmission ratio. Such properties enable an engine to be operated much of the time at or close to an optimally efficient engine speed, avoiding swings in speed known to occur in other engines where only a finite number of transmission ratios are available. Commonly owned U.S. Pat. No. 9,097,344 to Hoff et al. is directed to an automatic shift control system for a powertrain. In Hoff et al. a control device selectively varies transmission ratio in response to a shift signal, such as where a speed ratio of a transmission is to be adjusted in anticipation of a load change. While Hoff et al. appears well-suited to its intended applications there is always room for improvement.

SUMMARY

In one aspect, a method of operating a machine includes operating an engine of the machine at a lower engine speed, and transferring torque by way of a continuously variable transmission (CVT) from an output shaft of the engine to a drive shaft coupled with ground-engaging elements of the machine. The method further includes receiving data indicative of an expected increase in a load on the engine, and commanding increasing engine speed responsive to the data. The method further includes operating the engine at a higher speed responsive to the commanded increase, and limiting lugging the engine by way of initiating the operating of the engine at the higher engine speed prior to the occurrence of the expected increase in load on the engine.

In another aspect, a machine includes a frame, an engine coupled to the frame, and ground-engaging elements coupled to the frame. The machine further includes a continuously variable transmission (CVT) coupled between the engine and the ground-engaging elements, and an engine speed control system. The engine speed control system includes a monitoring mechanism structured to monitor a machine parameter indicative of one of a plurality of power demands of the machine, a throttle, and an electronic control unit coupled with the monitoring mechanism and with the throttle. The electronic control unit is structured to determine an expected increase in a load on the engine responsive to the data from the monitoring mechanism, and to responsively command an adjustment in a position of the throttle such that an increase in engine speed is initiated prior to occurrence of the expected increase in load on the engine.

In still another aspect, an engine speed control system for a machine having a continuously variable transmission (CVT) includes a plurality of monitoring mechanisms structured to monitor a plurality of different machine parameters indicative of a plurality of different power demands of the machine. The system further includes a throttle structured to couple with an engine of the machine and movable so as to adjust a fueling of the engine to vary engine speed. The system further includes an electronic control unit coupled with the plurality of monitoring mechanisms and with the throttle, and the electronic control unit being structured to receive data from the plurality of monitoring mechanisms indicative of an expected increase in load on the engine. The electronic control unit is further structured to limit lugging the engine by way of commanding an adjustment in a position of the throttle, such that an increased engine speed is produced, responsive to the data, and prior to the occurrence of the expected increase in load.

DETAILED DESCRIPTION

Figure 1:
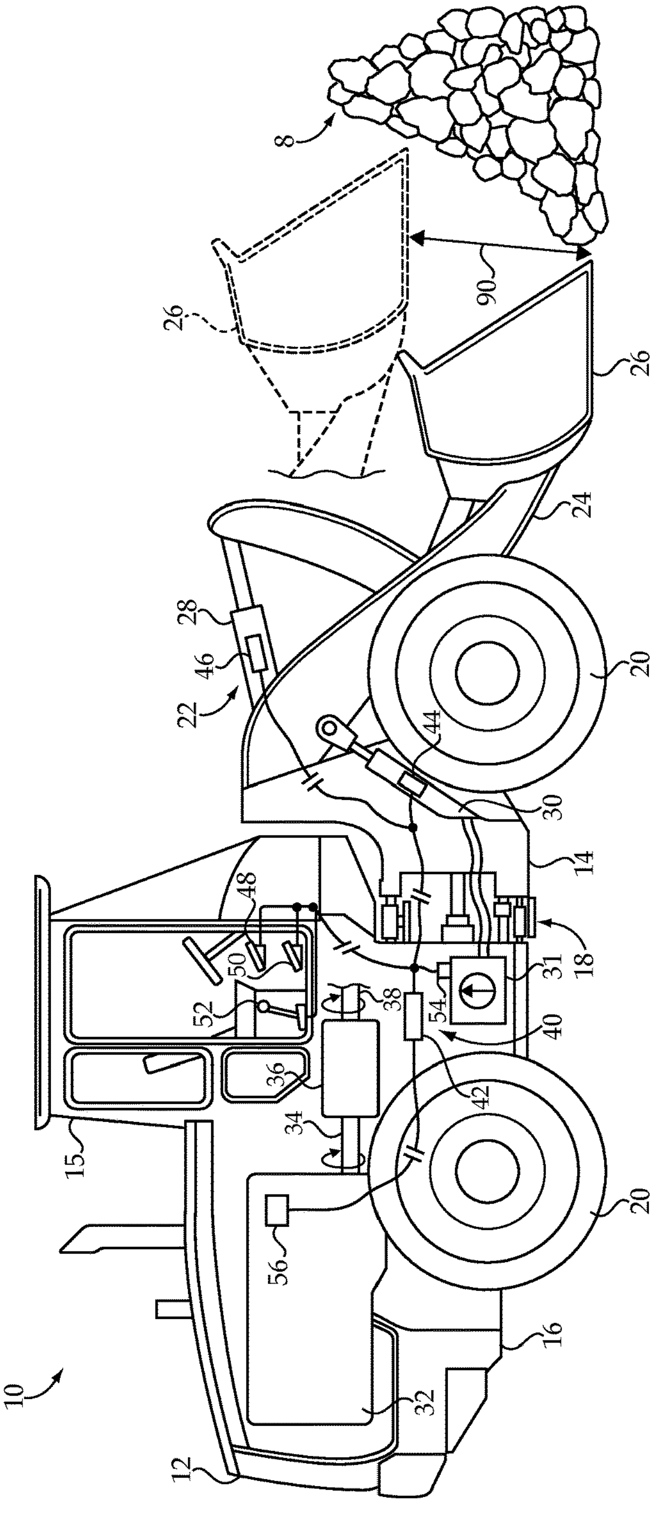
FIG. 1 is a side diagrammatic view of a machine, according to one embodiment.

Referring to FIG. 1, there is shown a machine 10 according to one embodiment positioned as it might appear in proximity to a material pile, such as an aggregate, sand, soil, trash, or other material pile. Machine 10 is shown in the context of a loader, namely a wheel loader, including a frame 12 having a front frame unit 14 and a back frame unit 16 structured to rotate relative to one another about an articulation joint 18. The present disclosure is not limited to a wheel loader, however, and a variety of other machine types including non-articulated loaders, haul trucks, tractors and still others may benefit from application of the teachings set forth herein. In a practical implementation strategy, an operator cab 15 is mounted to back frame unit 16 and has various conventional operator controls positioned therein. Ground-engaging elements 20 in the nature of ground-engaging wheels are coupled with frame 12 at front frame unit 14 and back frame unit 16. Machine 10 further includes an implement system 22 including a linkage 24 and a bucket 26. Linkage 24 is movable in a conventional manner between a raised position, and a lowered position approximately as shown. Bucket 26 is tiltable through a range of positions in a generally conventional manner, and can be raised and lowered by way of raising and lowering linkage 24. Bucket 26 is shown partially raised in phantom lines a distance 90 from the ground. Bucket orientation or tilt angle, and bucket height as indicated by linkage position, are machine parameter that can be used in determining when machine 10 is being operated in anticipation of entry into material pile 8, the significance of which will be apparent from the following description. In general, bucket 26 is lowered for pile entry, and raised for travel and for dumping. Machine 10 further includes an internal combustion engine 32 having an engine output shaft 34 coupled with a transmission 36 that includes a transmission output shaft 38 coupled with ground-engaging elements 20. Transmission 36 includes a continuously variable transmission (CVT), including any of a hydrostatic CVT, an electric drive CVT, a belted CVT, a variable-diameter pulley CVT, hybrids of these, and still others. A powertrain of machine 10 could include additional components not shown in FIG. 1 such as a torque converter, locking clutch, low range and high range gearing, depending upon the CVT architecture that is used. As further discussed herein, machine 10 is uniquely structured for control of engine speed to provide advantageous operation over certain known strategies, and in particular to limit fuel consumption in comparison with such known operating techniques without unduly affecting performance.

To this end, machine 10 may further include an engine speed control system 40 having an electronic control unit 42, and a plurality of monitoring mechanisms coupled with electronic control unit 42 and structured to monitor a plurality of different machine parameters each indicative of a different one of a plurality of power demands of machine 10. In a practical implementation strategy, system 40 includes a linkage position sensor 44, a bucket tilt sensor 46, a left pedal 48 and a right pedal 50 each positioned within operator cab 15, a pump sensor 54, and a throttle 56. A shifter 52 may be positioned in operator cab 15, also coupled with electronic control unit 42, and structured to enable an operator to shift among a forward gear, a reverse gear, and neutral, or provide for low range and high range shifting in certain embodiments. Each of linkage position sensor 44 and bucket tilt sensor 46 may be structured so as to provide an output state producing a signal, or an output state suitable for interrogation by electronic control unit 42, that is indicative of a position of the monitored element. Thus, linkage position sensor 44 may produce data indicative of a position of linkage 24 relative to frame 12 or to the ground, and bucket tilt sensor 46 may produce data indicative of a position of bucket 26 relative to frame 12 or to linkage 24, or relative to any other reference point. Sensors 44 and 46 may have the form of linear position sensors coupled with actuators 30 and 28, respectively, but could also be rotary potentiometers positioned at pivot locations of linkage 24 and bucket 26 as the case may be. In still other embodiments, sensors 44 and 46 might be optical cameras, or any other suitable monitoring device capable of indicating the state of the monitored parameter of interest. Pump sensor 54 may be coupled with a hydraulic pump 31 of implement system 22 and structured, for example, to monitor an angle of a variable angle swash plate in pump 31 so as to indicate a torque that is requested of pump 31 to provide power to implement system 22. Pump 31 may be driven by way of a geartrain of engine 32.

In a practical implementation strategy, right pedal 50 may include a throttle control pedal, a position of which is indicative of operator requested engine fueling and generally requested engine speed. In a further practical implementation strategy, machine 10 may operate in a so-called throttle locked mode such that engine speed is held steady at least much of the time at an engine speed where operation of engine 32 is optimally fuel efficient. Left pedal 48 can be understood to have a function somewhat analogous to a manual clutch in certain manual transmissions, and has a variable position whereby an operator can modulate torque transferred from CVT 36 to ground-engaging elements 20. In one embodiment, left pedal 48 is depressed to reduce torque transferred to ground engaging elements 20, potentially to zero, and lifts to restore and increase the torque. In the case of a hydrostatic transmission manipulating left pedal 48 could adjust pump displacement, and in the case of an electric drive machine manipulating left pedal 48 could vary electric motor torque, to list some examples. An operator can utilize right pedal 50 and left pedal 48 together to modulate torque applied to ground engaging elements 20. While it is desirable to retain flexibility in operator control over engine speed and propulsion torque, for reasons that will be further apparent from the following description machine 10 is advantageously operated in a fuel economy mode whereby control over throttle position and thus engine speed is handed off to electronic control unit 42 at least some of the time.

In view of the foregoing discussion it will be appreciated that a variety of machine parameters are monitored that can each give an indication of a different power demand of machine 10. For instance, a pump state such as a swash plate angle indicated by sensor 54 can be indicative of a power demand of implement system 22. Torque to ground engaging elements 20 can be indicative of a powertrain propulsion demand. Positions of linkage 24 and bucket 26 can be indicative of present activity being undertaken by implement system 22 such as digging, pushing or lifting. In a practical implementation strategy, a position of linkage 24, potentially a position of bucket 26, and a state of left pedal 48 can be monitored to determine whether machine 10 appears to be positioned and operated in anticipation of an increased power demand such as entering a material pile such as pile 8 to load bucket 26. In FIG. 1 bucket 26 is shown by way of the solid lines approximately as it might appear positioned for pile entry, and could be raised distance 90 for travel after capturing a bucket load and typically also curled or racked back. Accordingly, in at least certain embodiments electronic control unit 26 may be structured to detect when an operator is preparing to enter a pile of material based on whether linkage position is at or within a predefined range of a position where bucket 26 where bucket can be considered to be lowered for pile entry. Such a detection strategy can also include determining whether machine 10 is decelerating, or being commanded to decelerate, such as by monitoring left pedal position as described herein. If left pedal 48 is being depressed then it might be concluded that pile entry is not imminent, and thus no actions taken in anticipation thereof. In a practical implementation strategy, left pedal position or otherwise a state of an operator controlled torque control pedal, and a linkage parameter such as linkage position are both monitored such that electronic control unit 42 can proactively determine an expected material pile entry that produces an expected increase in power demand and thus an expected increase in load on engine 32, as further described herein. Embodiments are also contemplated where still other monitoring mechanisms are employed to determine what present power demands on machine 10 are, and what changes in power demands and thus load on engine 32 are expected. For example, tilt sensors could be employed to detect when machine 10 has begun traveling up a grade. Optical cameras could be employed to detect when machine 10 is approaching a grade. Still other conditions where machine power demand varies could be empirically identified by way of tracking machine operations over time, and electronic control unit 42 appropriately structured to detect such conditions as they occur or proactively and make appropriate adjustments to engine speed.

Those skilled in the art will be familiar with a general relationship between engine speed and engine power output. In the case of machine 10, each of the separate power demands such as a power demand for machine propulsion, a power demand for implement actuation and torque, and still others are met by providing a power output from engine 32 that is generally proportional to engine speed. Another way to understand the phenomenon is that a load on engine 32 is generally matched to certain power demands of machine 10 generally, and engine speed controlled to accommodate the engine load requirements. Thus, for relatively higher power demands of machine 10 a relatively higher engine speed may be appropriate, and for relatively lower power demands a relatively lower engine speed may be appropriate. Where fuel consumption is no object, or of less concern, and machine performance is paramount, then fuel economy mode will not be used and an engine speed might be produced that will provide more than enough power output for any given task or operating state of machine 10. There continues to be interest in fuel economy in the industry, however, and thus strategies where fuel consumption can be reduced without unduly sacrificing machine performance are desirable.

To this end, machine 10 and control system 40 may be structured to provide an engine speed that is matched to a maximum one of the power demands of machine 10, and thus avoid overcompensating or otherwise providing ample and extra engine power output for any engine operating state or to achieve any given task. Fuel economy mode according to the present disclosure can be generally understood as providing a desired power output of engine 32, by way of controlled engine speed, that is sufficient to accommodate whatever the highest single power demand is of machine 10 at a given time. Thus, if powertrain power demand is highest at a given time, then an engine speed is commanded that will accommodate that powertrain power demand. If implement torque power demand is highest, then an engine speed is commanded that will accommodate that implement torque power demand. In some instances, performance of machine 10 may be slightly reduced where engine speed is thusly controlled, but with any performance degradation being offset by improvements in fuel economy. This strategy is believed to be particularly applicable to reducing fuel consumption based upon parasitic losses to auxiliary engine-driven components such as pumps, compressors, and the like, as many of such components rotate at a speed that is proportional to engine speed even if the present demands of such components could be satisfied at lower speeds. The present disclosure further reflects the insight that fuel economy can be still further improved without unduly affecting performance where changes in power demand, resulting in an expected increase in load on engine 32, are identified proactively rather than reactively and engine speed adjustment initiated in advance of the occurrence of a change in load on engine 32. As further discussed herein, electronic control unit may be structured by way of one or more computer processors, memory, and suitable programming to operate machine 10 in a fuel economy mode that includes controlling engine speed so as to provide an engine power output that is matched to a maximum one of a plurality of power demands on machine 10, and to proactively control engine speed to provide that engine power output in anticipation of changes in load on engine 10. In a practical implementation strategy, electronic control unit 42 is structured by way of the engine speed control disclosed herein to limit lugging engine 32, and thus reduce degradation of performance of machine 10 such as retarding of ground speed, limiting implement power, and a host of other performance parameters.

Figure 2:
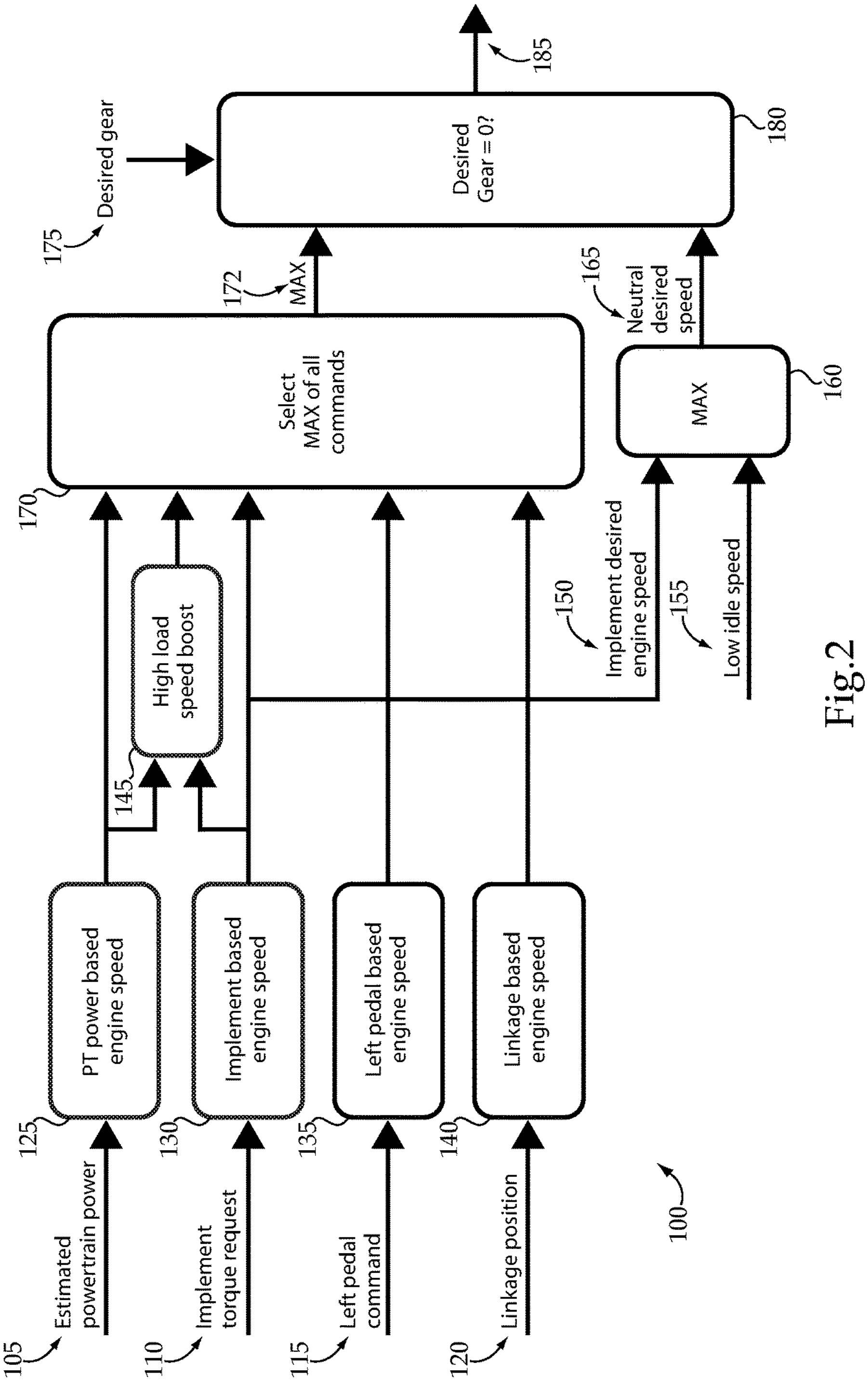
FIG. 2 is a block diagram of an engine speed control strategy, according to one embodiment.

Referring also now to FIG. 2 there is shown a block diagram 100 illustrating control features and functions of engine speed control system 40. A plurality of power demand inputs are shown, including an estimated powertrain input 105, an implement torque request 110, a left pedal command 115, a linkage position 120. Each of the power demand inputs are shown converted to engine speed values, including a PT (powertrain) power based engine speed 125, an implement based engine speed 130, a left pedal based engine speed 135, and a linkage based engine speed 140. Each of the engine speed values are inputted to a control block 170 where they are compared, and a MAX of all of the engine speed values or commands is selected. Block 170 can be understood as comparing the plurality of different power demands of machine 10, and determining an engine speed command responsive to the comparison. Another control block 180 processes the MAX output 172 and queries whether a desired gear=0? If yes, it can be determined machine 10 is in neutral and a neutral desired engine speed is commanded. If desired gear is not zero, then an engine speed command 185 in the nature of a throttle position, for example, can be outputted to throttle 56 or to a separate engine speed controller that is coupled with throttle 56. In parallel with block 170, an implement desired engine speed 150 and a low idle speed 155 can be compared in a block 160 to determine whichever is higher, and thereby produce a neutral desired speed output 165 to block 180. At another control block 145, a high load speed boost is calculated based on PT power based engine speed 125 and implement based engine speed 130. The operation at block 145 can be understood to produce extra engine speed and power where both of the engine speed values from blocks 125 and 130 are relatively high.

INDUSTRIAL APPLICABILITY

Figure 5:
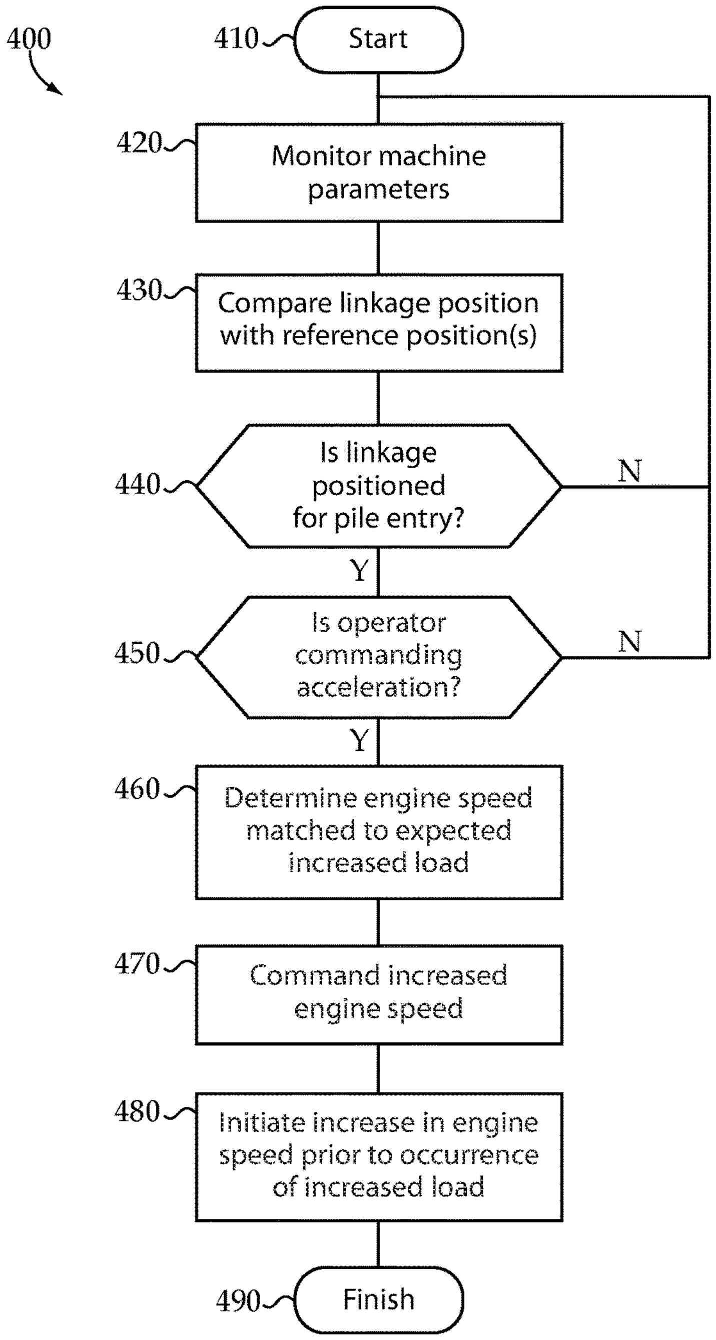
FIG. 5 is a flowchart illustrating example machine operation and control logic flow, according to one embodiment.

Referring to the drawings generally but in particular now to FIG. 5, there is shown a flowchart 400 illustrating example control logic flow according to one embodiment. In flowchart 400, the logic initializes or starts at block 410, and then advances to block 420 to monitor machine parameters. The monitored machine parameters may each be indicative of a different one of a plurality of power demands of machine 10, with one of the power demands relating to a power demand indicated by linkage position. From block 420 the logic advances to block 430 to compare linkage position with a reference position. At block 430, electronic control unit 42 may determine whether linkage 24 is within a range of positions suitable for and/or indicative of expected pile entry, for example. From block 430, the logic may advance to block 440 to query if linkage 24 is positioned for pile entry. If no, the logic may return to execute block 420 again or could exit. If yes, the logic may advance to block 450 to query is the operator commanding acceleration. If no, the logic may return or exit, for instance.

At block 450 electronic control unit 42 can be understood more broadly to be determining whether machine movement is suitable for or indicative of expected pile entry. Thus, additions and alternatives could include monitoring machine deceleration, querying whether machine 10 is stopped, turning, in neutral, or still other operations. If at block 450 the operator is commanding acceleration, the logic may advance to block 460 to determine an engine speed matched to an expected increase in power output demand, in other words an expected increase in load on engine 32, that corresponds with pile entry. From block 460 the logic may advance to block 470 to command increased engine speed, and to block 480 to initiate an increase in engine speed prior to occurrence of the expected increase in power output demand. The logic exits at block 490.

The control logic set forth in FIG. 5 has certain overlap with block diagram 100, but certain differences. As discussed above, electronic control unit 42 may be structured to detect an expected increase in load on engine 32. The logic set forth in flowchart 400 could represent a subroutine or parallel routine with a fuel economy mode as set forth in block diagram 100, that functions to proactively increase engine speed when appropriate conditions are detected. In a practical implementation strategy, when operating in a fuel economy mode, prior to or after a pile entry event or other instance of increased engine load machine 10 can be operated such that engine 10 is operating at a lower engine speed. Torque will be transferred by way of CVT 36 between shafts 34 and 38, with engine 32 operating at the lower engine speed. Electronic control unit 42 may receive data indicative of power demands of machine 10, compare the power demands, and determine engine speed that is matched to a maximum one of the plurality of power demands. An engine speed based solely on the maximum one of the plurality of power demands on machine 10 may be commanded. Over the course of a cycle of machine operation such as driving into a pile, loading bucket 26, dumping, and preparing to reload, a lower engine speed may be commanded at a first time such as where machine 10 is idle or otherwise not preparing for pile entry, and an increased engine speed may be commanded at a second time such as where linkage 24 has been lowered and machine 10 is preparing for pile entry.

As suggested above, during the monitoring of machine parameters, machine 10 may also receive data indicative of an expected increase in a load on engine 32, such as by detecting linkage position and possibly other factors that indicate engine power output demand may need to increase to accommodate operations of machine 10. Responsive to the data indicative of expected increase in load, electronic control unit 32 may command increasing engine speed, and in advance of the occurrence of the expected increase. It has been discovered that proactively increasing engine speed in certain instances can prevent degradations in performance that might otherwise be observed, especially when operating in a fuel economy mode.

Figure 3:
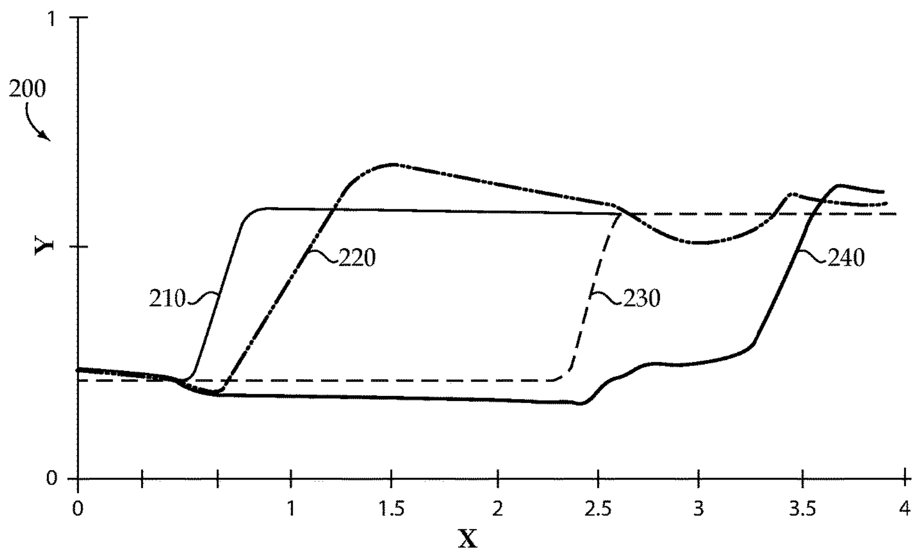
FIG. 3 is a graph illustrating machine operating parameters according to the present disclosure versus a known design.
Figure 4:
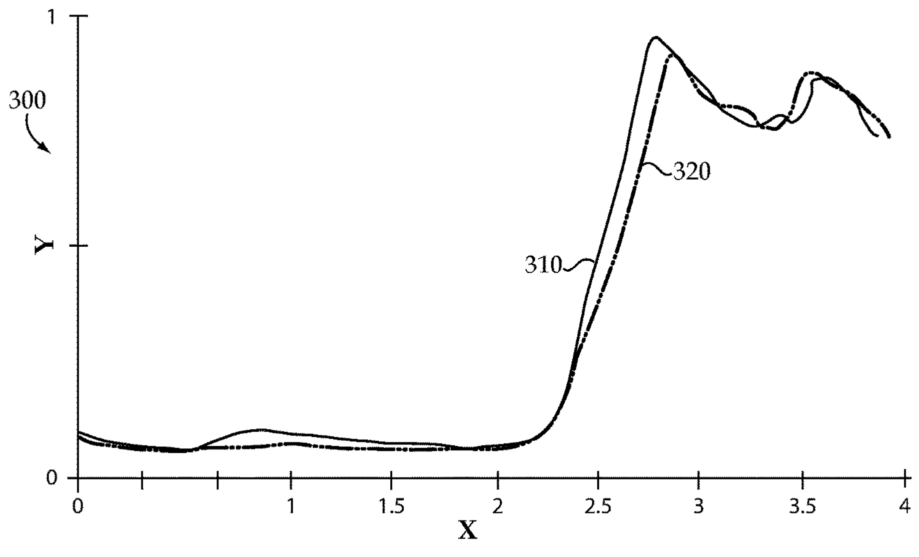
FIG. 4 is a graph illustrating other machine operating parameters according to the present disclosure versus a known design.

Referring also now to FIG. 3 there is shown a graph illustrating an engine speed command 210 that is made proactively, e.g. upon receipt of data indicating machine 10 appears to be preparing for entry into a material pile, and an engine speed signal 220 representing engine speed occurring in response to engine speed command 210. Also shown in FIG. 3 is a standard or conventional engine speed command 230 that is made in response to detecting a need for increased engine output power rather than proactively, and an engine speed signal 240 that represents the engine speed that is actually observed in response to engine speed command 230. In the FIG. 3 example, the subject machine might first enter a material pile shortly prior to a time 2.5 shown on the X-axis. It can be seen that engine speed 220 is reduced shortly after entering the pile, but then increases back to or close to a commanded engine speed just shortly after a time 3.5. Engine speed 240 on the other hand illustrates a different pattern of increase, plateau, and then further increase up to or close to a commanded engine speed at a later time, closer to time 4. Referring also to FIG. 4, there is shown a transmission torque 310 for a case where engine speed increase is commanded proactively, corresponding to engine speed signal 210 in FIG. 3, versus a transmission torque 320 where engine speed is not commanded proactively, corresponding to engine speed signal 230 in FIG. 3.

When a machine such as machine 10 enters a material pile, the interaction with the material can result in resistance against forward travel of the machine. To continue to travel forward against the resistance of the material an increased demand for output torque from the CVT may be required, and an increased load on the engine may be needed so long as machine ground speed is to be increased, maintained, or prevented from slowing unduly. Where an engine is attempting to speed up so as to produce increased output power for machine propulsion, energy can be diverted to the increasing of the engine speed instead of applying torque to the CVT. Another way to understand the phenomenon is that engine speed cannot be instantaneously increased to produce more power, and as a result some energy that might otherwise be available for machine propulsion or other purposes is instead used in an attempt to accelerate the engine.

Where engine speed is already controlled to be relatively low, such as for purposes of fuel economy, when a machine experiences an increase in demanded load it may not be possible or practicable to rapidly increase engine speed while also increasing or maintaining propulsion power or powering auxiliary devices. Lugging the engine can occur as a result. In the FIG. 3 example it can be seen that the retarding of engine speed, or retarding of engine speed increase, is more substantial in the case of engine speed 240, as the machine has already hit the pile of material when engine speed begins increasing. Where engine speed is commanded later, as with engine speed 240, the excess engine lugging can result in retarding of machine ground speed such that the machine spends more time getting through a material pile than in the case of a proactive engine speed increase as in the case of engine speed 220. In some instances, the reduced performance and greater time getting through the pile can result in consuming more fuel overall than if engine speed were proactively controlled as described herein so as to limit retarding ground speed of the machine. It can be seen from FIG. 4 that a rate of increase in transmission torque 310 is greater than a rate of increase in transmission torque 320. In the case of transmission torque 320, energy is being diverted to increasing engine speed rather than increasing transmission torque, and thus performance of the machine is negatively affected.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. A method of operating a machine comprising:

operating an engine of the machine at a lower engine speed;

transferring torque by way of a continuously variable transmission (CVT) from an output shaft of the engine to a drive shaft coupled with ground-engaging elements of the machine;

receiving data indicative of an expected increase in a load on the engine produced by a change in at least one of a plurality of power demands of the machine;

commanding increasing engine speed to a higher engine speed so as to provide an engine power output that is matched to a maximum one of the plurality of power demands of the machine, responsive to the data;

operating the engine at the higher engine speed responsive to the commanded increase; and limiting lugging the engine by way of initiating the operating of the engine at the higher engine speed prior to the occurrence of the expected increase in load on the engine.

2. The method of claim 1 wherein the data is indicative of an expected increase in a demand for output torque from the CVT.

3. A method of operating a machine comprising:

operating an engine of the machine at a lower engine speed;

transferring torque by way of a continuously variable transmission (CVT) from an output shaft of the engine to a drive shaft coupled with ground-engaging elements of the machine;

receiving data indicative of an expected increase in a load on the engine;

commanding increasing engine speed responsive to the data;

operating the engine at a higher engine speed responsive to the commanded increase;

limiting lugging the engine by way of initiating the operating of the engine at the higher engine speed prior to the occurrence of the expected increase in load on the engine; and limiting retarding a ground speed of the machine through a pile of material by way of the limiting of lugging the engine;

wherein the data is indicative of an expected increase in a demand for output torque from the CVT.

4. The method of claim 1 wherein the data includes data indicative of an expected increase in one of a plurality of power demands of the machine.

5. The method of claim 4 further comprising receiving data indicative of each of the plurality of power demands of the machine at a first time and at a second time, comparing the plurality of power demands at each of the first time and the second time, and commanding the lower and higher engine speeds responsive to the respective comparison.

6. The method of claim 5 wherein each of the commanded lower and higher engine speeds is matched to a maximum one of the plurality of power demands of the machine at the corresponding first time or second time.

7. The method of claim 4 wherein the data includes data indicative of a linkage position parameter.

8. The method of claim 7 wherein receiving data indicative of each of the plurality of power demands further includes receiving data indicative of a state of an operator controlled torque control pedal.

9. The method of claim 8 further comprising determining an expected material pile entry that produces the expected increase in load, responsive to the linkage position parameter and to the state of the torque control pedal.

10. A machine comprising:

a frame;

an engine coupled to the frame;

ground-engaging elements coupled to the frame;

a continuously variable transmission (CVT) coupled between the engine and the ground-engaging elements; and an engine speed control system including a monitoring mechanism structured to monitor a machine parameter indicative of one of a plurality of different power demands of the machine, a throttle, and an electronic control unit coupled with the monitoring mechanism and with the throttle;

the electronic control unit being structured to determine an expected increase in a load on the engine responsive to data from the monitoring mechanism, and to responsively command an adjustment in a position of the throttle such that an increase in engine speed is initiated prior to occurrence of the expected increase in load on the engine;

wherein the electronic control unit is further structured to compare each of the power demands of the machine, and to command a position of the throttle to produce the increase in engine speed responsive to the comparison.

11. The machine of claim 10 wherein the monitoring mechanism is one of a plurality of monitoring mechanisms each coupled with the electronic control unit and structured to monitor a different one of a plurality of machine parameters indicative of a plurality of power demands of the machine.

12. The machine of claim 11 comprising a loader having a linkage movable relative to the frame, and a torque control pedal structured to vary a torque transmitted between the CVT and the ground-engaging elements.

13. The machine of claim 12 wherein the plurality of monitoring mechanisms includes a first monitoring mechanism structured to monitor a linkage position parameter and a second monitoring mechanism structured to monitor a state of the torque control pedal.

14. The machine of claim 11 wherein the electronic control unit is further structured to command a position of the throttle to produce the increase in engine speed responsive to a maximum one of the plurality of power demands.

15. An engine speed control system for a machine having a continuously variable transmission (CVT) comprising:

a plurality of monitoring mechanisms structured to monitor a plurality of different machine parameters indicative of a plurality of different power demands of the machine;

a throttle structured to couple with an engine of the machine and movable so as to adjust a fueling of the engine to vary engine speed; and an electronic control unit coupled with the plurality of monitoring mechanisms and with the throttle;

the electronic control unit being structured to receive data from the plurality of monitoring mechanisms indicative of an expected increase in load on the engine; and the electronic control unit being further structured to limit lugging the engine by way of commanding an adjustment in a position of the throttle, such that an increased engine speed is produced, responsive to the data, and prior to occurrence of the expected increase in load;

wherein the electronic control unit is further structured to command a position of the throttle that produces a lower engine speed, and wherein each of the lower engine speed and the increased engine speed is matched to a different one of the plurality of power demands of the machine at a different time.

16. The system of claim 15 wherein the plurality of monitoring mechanisms includes a first monitoring mechanism structured to monitor a position of a linkage of the machine, and a second monitoring mechanism structured to monitor a state of a torque control pedal in an operator cab of the machine.

17. The system of claim 16 wherein the electronic control unit is further structured to detect entry of the machine into a pile of material responsive to a position of the linkage and to a state of the torque control pedal.

18. The system of claim 15 wherein the electronic control unit is further structured to determine the command for producing the lower engine speed and the command for producing the higher engine speed, responsive to a maximum one of the plurality of power demands at the corresponding time.

* * * * *